United States Patent [19]

Bryant et al.

[11] Patent Number: 4,517,566

[45] Date of Patent: May 14, 1985

[54] TRUE GROUND SPEED SENSOR

[75] Inventors: John H. Bryant, 1505 Sheridan, Ann Arbor, Mich. 48104; Steven M. Schultz, Ann Arbor, Mich.

[73] Assignee: John H. Bryant, Ann Arbor, Mich.

[21] Appl. No.: 415,061

[22] Filed: Sep. 7, 1982

[51] Int. Cl.³ .................................................. G01S 13/60
[52] U.S. Cl. .......................................................... 343/8
[58] Field of Search ............................................ 343/8

[56] References Cited

U.S. PATENT DOCUMENTS

| | | | |
|---|---|---|---|
| 3,833,906 | 9/1974 | Augustine | 343/8 X |
| 3,859,660 | 1/1975 | Augustine et al. | 343/8 X |
| 3,895,384 | 7/1975 | Fathauer et al. | 343/8 X |
| 4,231,039 | 10/1980 | Fritzlen et al. | 343/8 |
| 4,316,173 | 2/1982 | Matsumura et al. | 343/8 X |
| 4,317,117 | 2/1982 | Chasek | 343/8 X |
| 4,354,191 | 10/1982 | Matsumura et al. | 343/8 X |

Primary Examiner—T. H. Tubbesing
Attorney, Agent, or Firm—Stephenson & Boller

[57] ABSTRACT

A Doppler radar sensor is disclosed for use as a true ground speed sensor for a ground vehicle. The sensor comprises novel features resulting in a more efficient construction and improved performance. The sensor comprises an ellipsoidal reflector and when used as a true ground speed sensor in a ground vehicle the far focus is at the surface of the ground.

27 Claims, 15 Drawing Figures

TRUE GROUND SPEED SENSOR

BACKGROUND AND SUMMARY OF THE INVENTION

This invention relates to true ground speed (TGS) sensors of the type employing a Doppler radar system.

It is known that small Continuous Wave (CW) radars may be used to measure true ground speed of vehicles, such as farm tractors; for example see U.S. Pat. No. 3,094,693.

Presently used TGS sensors comprise Doppler systems. An example of such a system comprises a transmitter which may be a semiconductor device. (e.g., a Gunn diode), suitably placed in an electromagnetic (e.m.) resonant cavity with provisions for applying a D.C. voltage of specified value across the diode. A portion, typically less than 10%, of the D.C. energy is converted to e.m. energy at a frequency determined by the resonant cavity. A means, such as an iris opening, is provided to couple energy from the resonant cavity to a transmission line, typically a section of rectangular waveguide the size of which is appropriate to the e.m. frequency. Typically the transmission line is connected to an antenna which launches the e.m. energy into free space in a directed, shaped pattern. Typically the radar sensor is mounted on a ground vehicle about two feet above the surface of the ground and directed at a slant angle to the surface, either forward or backward-looking.

The e.m. energy striking the surface is both reflected and scattered, and a small portion of it (depending on many factors, including surface material, smoothness and presence or absence of objects, vegetation for example) gets re-directed back to the antenna which focuses it onto the primary feed and into the transmission line where it propagates toward the transmitter. Typically also contained in the transmission line is a receiver comprising a second semiconductor element, commonly known as a detector diode (e.g. a Shottky Barrier diode), placed across the rectangular wave guide and to one side of the center far enough that it intercepts about $\frac{1}{4}$ ($-6$ db) of the outgoing (transmitted) e.m. energy from the transmitter. For the return (received) signal the detector is similarly decoupled, but some compensation for that is obtained by placing it longitudinally (axially) one-fourth guide wavelength from the transmitter output which puts it in the highest e.m. field region of the standing wave. The effect of the absorption of a portion of the transmitted wave is to bias the detector diode into the sensitive region of its characteristic, while the return signal contains the information wanted. A fixed resistor of typically 500 ohms may be connected between the detector diode output and ground, with that output being connected to an amplifier, which completes the receiver.

When there is no relative movement between the vehicle and objects in the antenna beam pattern, the output signal frequency is zero, and the output signal from the detector diode is a DC voltage. This is because the return signal is at the same frequency as the transmitted signal.

If there is a relative motion between the radar sensor and a reflector of e.m. energy in the beam pattern, the received signal will be shifted in frequency either up or down by an amount equal to the Doppler frequency:

$$f_D = 2v/\lambda \cos \theta \quad (1)$$

where $f_D$ is the Doppler frequency, v is relative radial velocity or velocity along the axis of the radar, $\lambda$ is the wavelength of the e.m. wave, and $\theta$ is the angle between the direction of travel of the vehicle and the boresight axis of the radar beam. Whether the received signal frequency is shifted up or down compared to transmitted frequency depends on whether the reflecting surface is moving toward or away from the sensor. The strength of the received signal depends on many factors that are either known or can be estimated.

The choice of frequency for the e.m. energy depends on many factors, including: function, physical size and governmental regulations. Aside from the fact that antenna size for a given value of gain is proportional to wavelength, and hence inversely proportional to e.m. frequency, higher frequencies should be advantageous in magnitude and character of the reflected signal from the surface.

Frequency bands assigned in the U.S.A. by the FCC for non-licensed field-disturbance sensors, Part 15, include 10.525 GHz±25 MHz and 24.125 GHz±50 MHz, the two highest frequency bands assigned. There has been extensive use of the 10.525 GHz band for police radars, and in far larger quantities (hundreds of thousands per year) in microwave intrusion sensors (burglar alarms) and automatic door openers. Consequently, the availability and cost of transceiver (transmitter/detector) assemblies is favorable to the lower frequency. The use of the 24.125 GHz band has thus far been much less in spite of its potential advantages.

A recent interest in use of TGS radar sensors is in connection with the measurement of wheel slip of the driving wheels of a farm tractor pulling heavy loads while working. Depending upon the load and soil conditions, the wheel slip for optimum pull may range from eight to fifteen percent. On the other hand, with the operator of a present-day tractor having a closed cab and being isolated from noise and also quite busy monitoring the vehicle and the attachments and navigating the vehicle, it is quite possible for the wheel slip to considerably exceed optimum values without the operator being aware of it. This leads to non-optimum pulling, a reduction in efficiency, increased tire wear and increased consumption of fuel. The need for a change of gears (speed) or change in load (e.g., plow depth), or both, needs to be anticipated before slippage becomes excessive.

It is known that a measure of wheel slip may be obtained by comparing the speed indicated by a radar sensor mounted on the vehicle to the wheel speed measured by a sensor on the drive wheel, and hence the operator can be alerted to non-optimum wheel slip conditions through the inclusion of means for performing such a measurement and for providing a warning alert to the operation when non-optimum conditions occur.

Another use for TGS information is in connection with operation of seeding equipment to insure that a uniform non-varying amount of seed is applied per unit of distance traveled, or with spraying equipment to insure a uniform distribution of spray with distance. The need for measuring TGS are several, and if the cost can be brought down sufficiently, it is likely that more applications will be found.

The present invention is directed to a new and improved TGS sensor of the type employing a Doppler radar system.

One important objective of the invention is to improve the performance of this type of sensor while concurrently simplifying its design so that a more cost-effective construction results. Hence, one important aspect of the invention involves the construction and arrangement of the microwave assembly which includes the radome, antenna, antenna feed, transmission line, and detector/transmitter assembly. Some of the more specific inventive features relate to the construction and arrangement of the antenna feed and of the antenna reflector, and they provide desirable assembly features, allow a certain amount of beam pattern shaping, and can accommodate optical, including infrared, signals as well as microwave.

One feature involves the use of an ellipsoidal antenna reflector, as opposed to the parabolic reflectors and pyramidal horns which have heretofore been used in TGS sensors. While the gain of a horn antenna may be increased by increasing the length of the horn, an inherent disadvantage is that the volume of space that must be accommodated also increases. A parabolic antenna on the other hand takes the form of a shallower dish. The use of an ellipsoidal antenna reflector similarly reduces the volume of space which the sensor occupies, and it has the advantage over a parabolic reflector in that it allows for better focussing of the beam. The ellipsoidal antenna reflector illuminates a somewhat smaller area than a parabolic reflector would at a distance of around four feet from the sensor (a typical figure for use in ground vehicles). This distance represents that between the two foci of the ellipse, one being at the antenna feed and the other at the surface of the terrain. In practice the precise distance is not particularly critical.

For plane polarization (as opposed to circular polarization) the beam pattern has two well-defined axes perpendicular to the direction of propagation which is along the boresight axis of the beam. These are referred to as the E-field and the H-field, respectively. The direction of polarization is generally referred to as that of the E-field. Thus vertical polarization signifies that the E-field is perpendicular to the surface. The polarization used affects the amount of signal reflected back from the surface, and vertical polarization is the preferred choice in this application.

To a certain extent the beam width can be controlled independently in the two planes. In the sensor for ground speed measurement it is an advantage to have a beam pattern that is narrower in the vertical plane than in the horizontal, to make the illuminated area on the surface more nearly a circle than for a symmetrical beam pattern since the axis of the sensor is at an angle to the horizontal.

The construction for the preferred embodiment of sensor disclosed herein is one of rugged construction and of more compactness, yet one which functions to achieve an accurate measurement of vehicle movement. The sensor is an enclosed unit in which the radome is at one longitudinal end and an electrical cable connector at the opposite end. The radome is a plastic element and hence it should require no maintenance except for routine cleaning of the plastic window forming the radome. The sensor can also be readily installed and adjusted on a ground vehicle.

A related aspect of the invention involves the use of improved electronic circuitry for providing the output signal which is indicative of vehicle movement.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
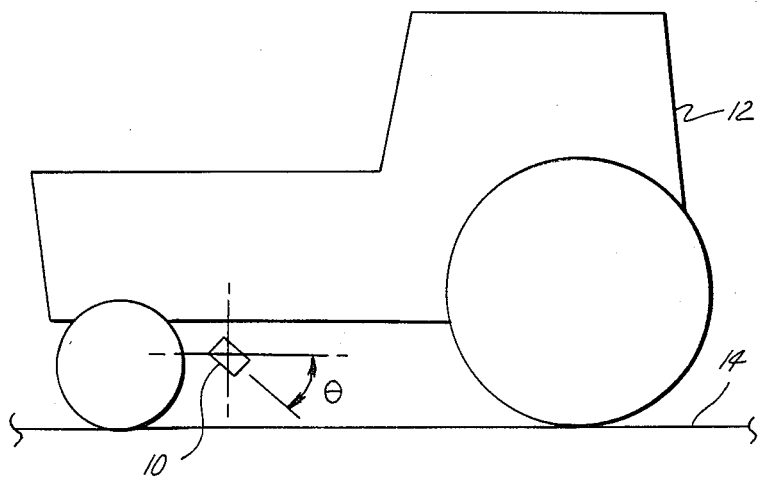
FIG. 1 is a side elevational view illustrating a TGS sensor embodying principles of the present invention in use on a ground vehicle.

FIG. 1 illustrates a TGS sensor 10 mounted on a ground vehicle 12. This drawing figure is intended to be diagrammatic in nature to illustrate principles relating to operation of the invention as opposed to the actual mounting of the sensor on the vehicle. The illustrated ground vehicle is an off-road type exemplary of those used in agricultural and/or constructional applications. The TGS sensor is disposed on the underside of the ground vehicle and is oriented so as to transmit a radar beam at a slant angle to the surface 14 over which the vehicle is traveling. Assuming for purposes of explanation that the vehicle is traveling over a horizontal surface the direction of transmission of the emitted electromagnetic radiation is illustrated to be at a nominal angle $\theta$ which for example is 45°. It is possible for the actual angle to differ from this nominal angle as will be explained in greater detail later on in connection with FIGS. 6 and 7.

A portion of the transmitted radiation is reflected by the ground surface back to the sensor and in accordance with principles of operation generally explained above, the Doppler shift of the received signal relative to the transmitted signal is used as an indication of travel or movement of the vehicle across the ground surface. The instantaneous Doppler shift is indicative of the instantaneous relative velocity of the ground sensor to the ground surface and hence may be considered as representative of true ground speed. This presumption is true for the absence of any moving objects within the beam pattern which might be of sufficient reflectivity to interfere with the Doppler signal reflected from the ground which is indicative of the true ground speed. The measurement of true ground speed takes place substantially regardless of the nature of the particular surface over which the vehicle is traveling (assuming the absence of any interfering moving objects in the beam pattern) and is substantially independent of any slip which might occur between the wheels of the vehicle and the ground surface. Hence a reliable and accurate measurement of true ground speed is obtained.

Figure 2:
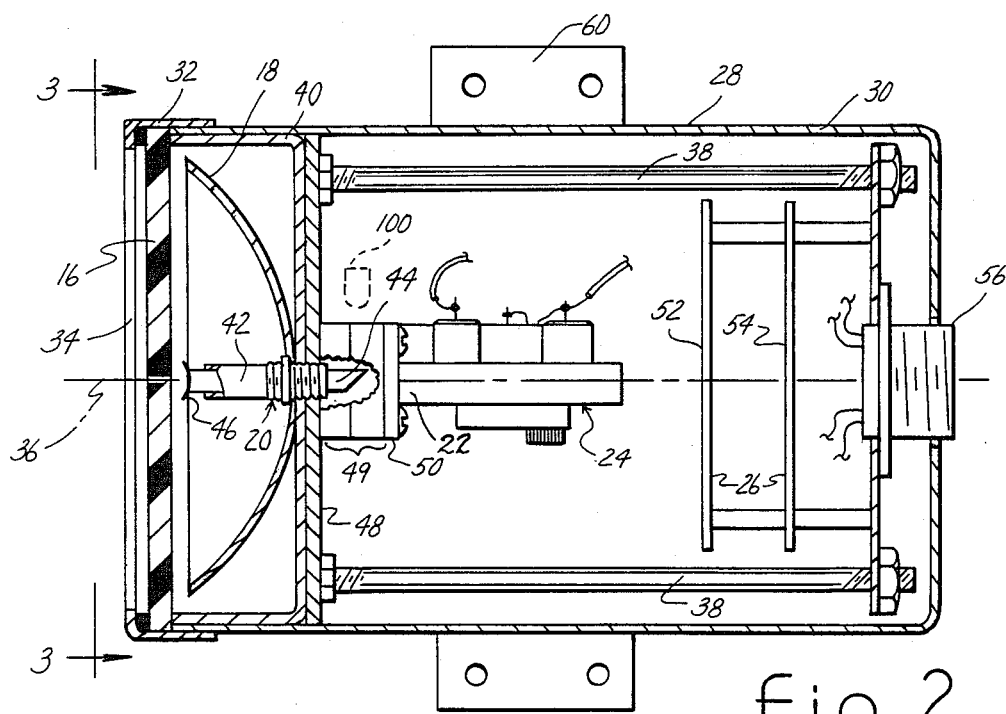
FIG. 2 is a longitudinal sectional view through a presently preferred embodiment of TGS sensor embodying principles of the present invention.
Figure 3:
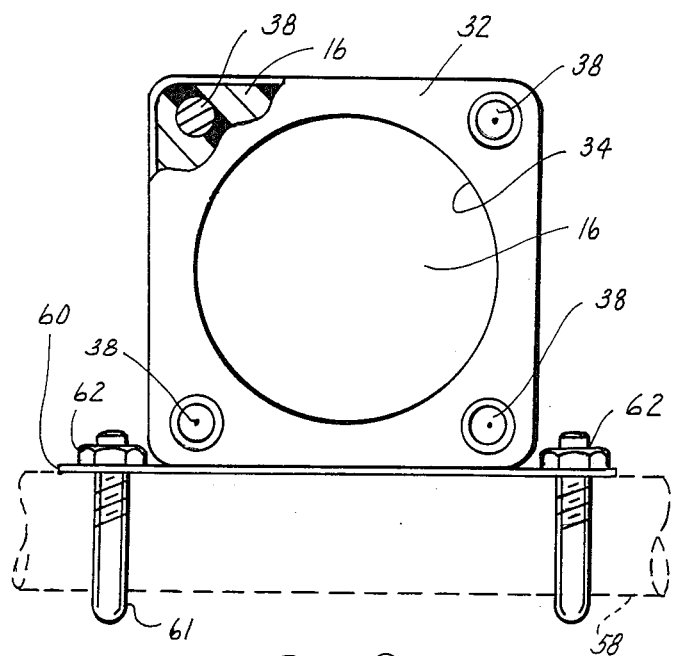
FIG. 3 is a view taken substantially in the direction of arrows 3—3 in FIG. 2.
Figure 4:
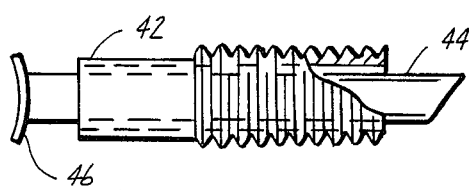
FIG. 4 is an enlarged view illustrating greater detail of a portion of FIG. 2.

FIGS. 2, 3, and 4 illustrate details of TGS sensor 10. TGS sensor 10 may be considered as comprising a radome 16, an antenna reflector 18, an antenna feed 20, a transmission line 22, a transmitter/detector assembly 24, and electronics and signal processing circuitry 26, all of which are contained within a two piece housing 28.

The illustrated construction has a generally overall rectangular shape with the housing 28 comprising a main enclosure 30 and a cover 32 at the front end. The front end cover 32 telescopically engages the main enclosure 30 and it comprises a circular aperture 34 for radome 16.

The reference numeral 36 designates the longitudinal axis of the sensor, and aperture 34 is concentric with axis 36. The radiated electromagnetic radiation from the sensor passes through the radome 16 and aperture 34 toward the ground and reflected radiation passes back through the aperture and the radome.

The radome, or window, provides for efficient two way transmission of microwave signals and at the same time seals the enclosure against the environment. It has been found that the radome may be advantageously constructed by use of particular techniques. The choice of material for the radome involves electrical, mechanical, environmental and cost considerations. Because it is desirable that the radome be as transparent as possible to the passage of microwave frequency electromagnetic signals, the radome material should have a low dissipation, or loss factor. For purposes of mechanical strength it is desirable that the material be sufficiently strong and rugged to withstand the use to which it is put when mounted on a ground vehicle in the manner described above. Concerning the environment, the sensor may at times be exposed to fuel and oil and to various chemicals. From the standpoint of economy in manufacture and ease of mounting a planar shape is very advantageous.

The disclosed sensor comprises a radome which meets these various criteria. It is constructed as a plastic material in the form of a planar sheet of a suitable thickness which minimizes the loss factor yet which possesses suitable mechanical strength for its intended purpose. While there are a number of possible candidate materials, polystyrene and polypropylene are deemed to be particularly suitable. For both the dielectric constant is approximately 2.55:1 compared to that of air. In order to minimize the reflection loss at the radome/air interfaces due to this difference in respective dielectric constants, the thickness should be either substantially small in relation to the transmitted wavelength or it should be an integral multiple of a half wavelength. For microwave frequencies at 24.125 GHz, one half wavelength calculates to a thickness of 0:154 inches for the radome. The 0.154 inch thickness has excellent mechanical strength and ruggedness for a three inch diameter unsupported area (i.e. the diameter of the aperture 34 in the disclosed embodiment).

The internal framework for the sensor includes four longitudinal rods 38 each set inwardly from a corresponding one of the four longitudinal edges of the housing enclosure. The radome has four corresponding holes through which the rods pass.

The antenna reflector 18 is disposed within the sensor in alignment with the aperture 34, and the illustrated antenna reflector has a diameter of slightly less than the three inch diameter of aperture 34. The reflector is disposed within a circular cylindrical cup 40 within the housing enclosure, and both the reflector and cup have central circular apertures which provide for their mounting on the centrally disposed antenna feed assembly 20. It will be observed that the reflector is of ellipsoidal shape and it provides for corresponding axial compactness in the construction of the sensor.

The primary illumination of the reflector is produced by the antenna feed 20. The illustrated construction for the antenna feed 20 has desirable assembly features, allows for a certain amount of beam pattern shaping and can accommodate optical signals as well as microwaves. The antenna feed comprises a metal feed tube 42 and a circular cylindrical dielectric quartz rod 44. A splash plate 46 is centered on and attached to one end of the quartz rod 42. The antenna feed forms a circular waveguide for the e.m. radiation.

The antenna feed is mounted on the sensor by means of a mounting plate or bulkhead 48 which is supported from the rods 38 at the four corners. The antenna feed tube 42 is a conductive metal whose O.D. is threaded allowing the feed tube to be threaded into a corresponding tapped hole at the center of the mounting plate. The feed tube has a circular bore extending along its full length, and the circular quartz rod 44 fits into that bore. The length of the quartz rod is such that it projects at both ends from the antenna feed tube. One end of the dielectric rod is disposed substantially at the near focus of the ellipsoidal reflector 18. It is at that end that splash plate 46 is attached. The opposite end of the quartz rod extends into the microwave transmitter/detector assembly 24 where it is in communication with the transmission line 22 which joins the microwave transmitter/detector assembly 24 to the antenna feed.

The microwave transmitter/detector assembly 24 includes a waveguide flange 50 via which mounting onto the bulkhead 48 takes place so as to thereby mount the microwave transmitter/detector assembly onto the framework of the sensor and to couple the rectangular waveguide transmission line of the transmitter/detector to the dielectrically loaded circular waveguide, and hence to the antenna feed. Interposed between bulkhead 48 and waveguide flange 50 may be an impedance matching section 49.

The use of the fused quartz element in the circular waveguide antenna feed is advantageous. This material possesses excellent transmission properties at optical (meaning visible and infrared) and microwave frequencies. Another advantage in using quartz is that with dielectric constant of around 4.0, the diameter need be only 4 mm, which slips inside a $\frac{1}{4}''\times\frac{1}{2}''$ waveguide section of the waveguide transmission line of the transmitter/detector. By cutting the right hand end of the quartz at an angle to thereby provide a taper, an improved coupling between the circular and rectangular waveguide sections is obtained, and a convenient means for introducing and/or extracting optical signal frequencies into and/or from along the boresight axis is also provided. The angle cut creates an internal reflective surface for optical signals which reflects axial optical signals in a transverse direction and vice-versa. Hence an incoming optical signal will be reflected laterally of axis 36 by the tapered end cut, and an optical detector device, a photocell or photodetector for example, can be disposed to one side of the axis to detect the transversely moving optical signal. FIG. 2 schematically illustrates such an arrangement for a 45° taper producing a 90° change in direction of the optical signal. A suitable hole or opening is provided in the waveguide or matching section to allow the reflected optical energy to pass through. This can be done without any significant effect on the microwave transmission. The detector 100 is a photodetector which is disposed laterally of the end taper.

Figure 13:
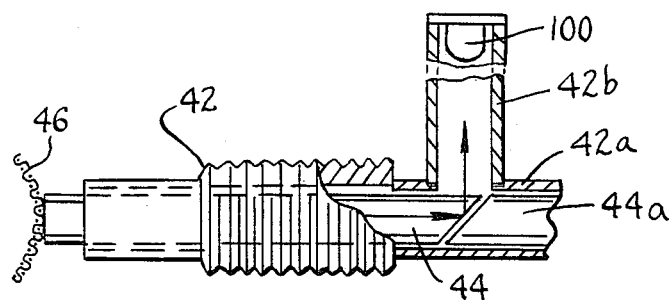
FIG. 13 is a view similar to FIG. 4 illustrating a modified form.

FIG. 13 illustrates another arrangement in which a second quartz rod 44a is in alignment with rod 44, and the two rods have complementary tapers at their confronting ends. Both rods are within a circular waveguide 42a, and a further tube 42b intercepts 42a at the confronting ends of the rods 44a, 44, there being a suitable hole in 42a to receive tube 42b, with the tubes being suitably secured together. Photodetector 100 is disposed within the further tube 42b. The photodetector can be used to detect visible and infrared wavelengths. Tube 42b is a conductive metal sleeve at a right angle to the waveguide over the hole in 42a so as to provide a waveguide-below-cut-off choke to impede escape of microwave signals, but allowing passage of optical signals to the optical detector. The microwave signal is transmitted past the cut in the quartz rod with little effect if the tapers of the rods are substantially complementary.

Disposed within the main enclosure 30 more rearwardly of the microwave transmitter/detector assembly 24 are circuit boards 52,54 containing electronics and signal processing circuitry. There are various electrical connections from the circuit boards to the microwave transmitter/detector assembly 24 and circuit connections to external components are provided via a connector plug 56 at the end of the housing opposite radome 16. The circuit connections provided by connector plug 56 are for DC power into the sensor and for electrical signals out.

Figure 6:
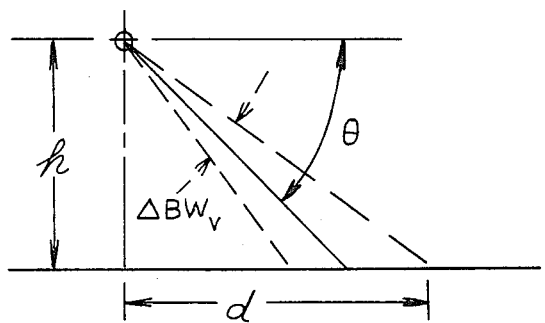
FIG. 6 is a diagram useful in explaining the geometry involved in the mounting of the sensor on the vehicle of FIG. 1.
Figure 7:
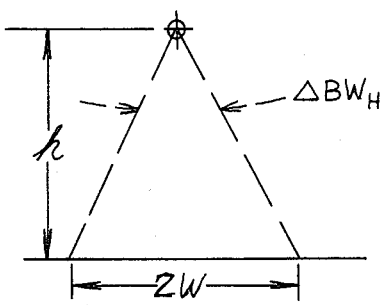
FIG. 7 is a view at 90° to FIG. 6.

Attention is directed to FIGS. 6 and 7 which illustrate the geometrical considerations involved in mounting of the sensor on the vehicle so as to achieve a clear zone between the sensor and the illuminated area of the ground surface. The sensor is preferably mounted so that the angle of the beam axis is in the direction of travel of the vehicle. This may be subject to a certain tolerance of plus or minus 5° by way of example. In the vertical plane the sensor is aimed toward the surface at an angle $\theta$ to the horizontal. The relative parameters for the clear zone of the disclosed embodiment of the sensor are illustrated in the following chart with reference to FIGS. 6 and 7. Examples are given for three different angles of inclination $\theta$.

| $\theta$ | d min. | 2 w min. | h max ft. | h max meters |
| --- | --- | --- | --- | --- |
| 37° | 2 h | h | 3.0 | 0.91 |
| 45° | 1.5 h | .9 h | 3.5 | 1.07 |
| 51.5° | 1.2 h | .8 h | 4.0 | 1.22 |

The clear zone, in addition to having the height h and the longitudinal expanse d has a lateral expanse 2w. The clear zone should be devoid of moving objects of the vehicle so that the only received e.m. energy is predominantly that reflected from the ground surface so that a true signal is received indicative of true movement along the surface of the ground.

The illustrated construction for the sensor is also advantageous for its mounting arrangement on the vehicle. The illustrated construction contemplates the use of ¾ inch round pipe 58 (in phantom in FIG. 3) mounted on the vehicle with the sensor being mounted on the pipe. Affixed to the housing enclosure of the sensor is a rectangular plate 60 which extends laterally beyond the sides of the housing enclosure. The ends of the plate are provided with a pair of mounting holes which are designed to accommodate standard size U bolts 61. The pipe axis is perpendicular to the fore-aft direction of the vehicle. The plate is disposed against the ¾ inch pipe, and the U bolts are inserted over the pipe with the distal ends of the U bolts passing through the holes in the plate so that nuts 62 can be threaded onto the distal ends of the U bolts to secure the sensor on the pipe. The sensor may be rotationally positioned about the axis of the pipe to provide an appropriate slant inclination of the beam axis to the direction vehicle travel, and once the proper positioning has been obtained the nuts are tightened to securely hold the sensor in place.

Figure 10:
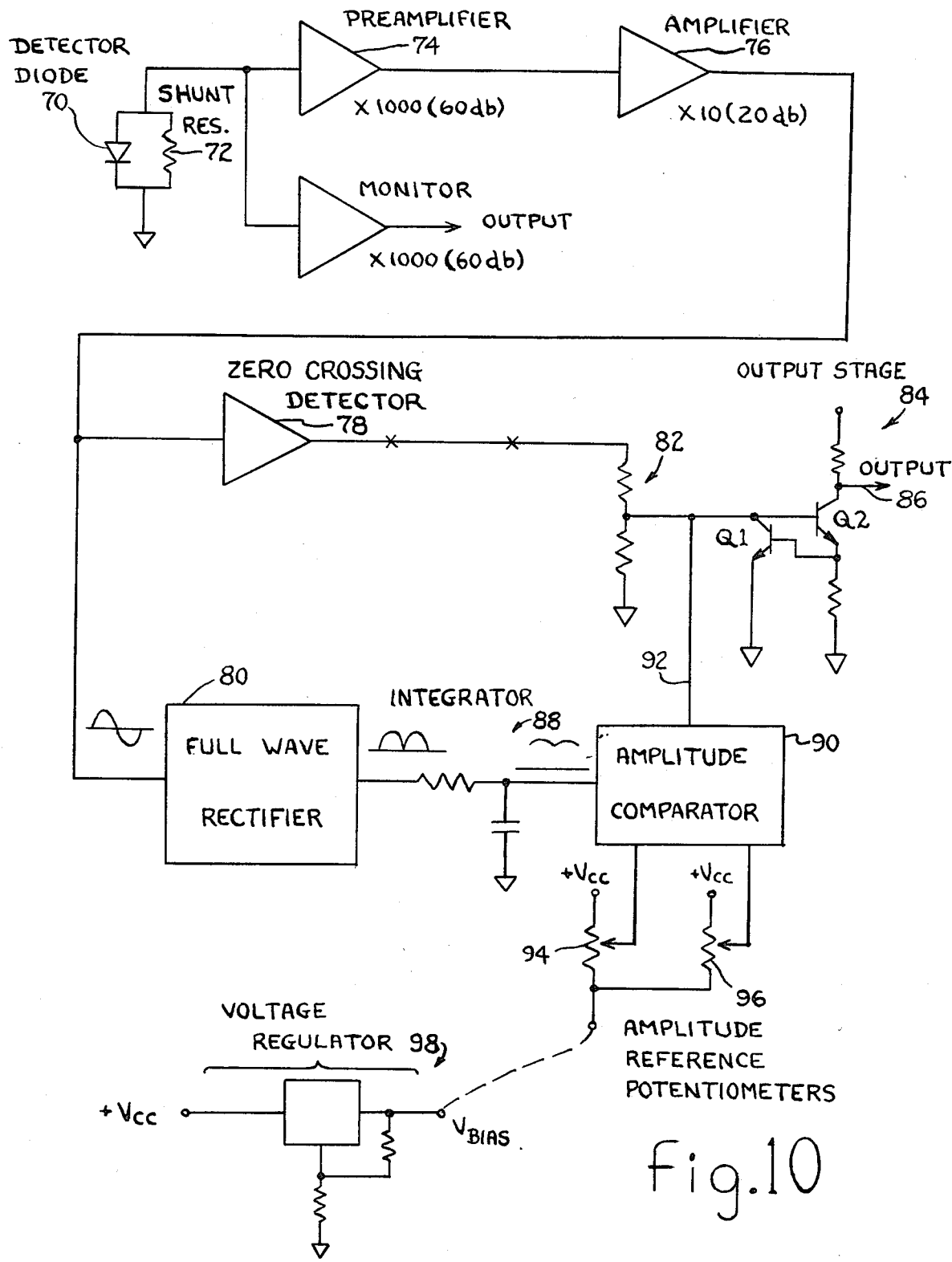
FIG. 10 is an electronic schematic diagram illustrating associated signal processing electronics.

FIG. 10 illustrates the electronic circuit which is contained on the two circuit boards within the sensor which develops the output signal which is supplied via the connector plug 56 to an appropriate meter or display on the vehicle for display to the operator. A detector diode 70 and a shunt resistor 72 form the input to a preamplifier stage 74. The detector diode signal amplified by preamplifier 74 is supplied to an amplifier stage 76. Amplifier stage 76 references the amplified detector diode signal to a bias level provided by the voltage regulator 98. The frequency response of amplifier stage 76 may be designed so that only signals with frequencies pertaining to the Doppler signal frequencies of interest are amplified. The output of stage 76 is in turn supplied as an input to both a zero crossing detector 78 and a full wave rectifier 80. The zero crossing detector converts the oscillatory sinusoidal waveform signal into a pulse train which has a frequency proportional to the signal, for example a rectangular waveform having a 50% duty cycle. This output signal from the zero crossing detector is coupled by a voltage divider 82 to an output stage 84. Stage 84 has an output 86 which is used to operate the meter and/or display such as that described above. Of course the information output may be used for any other purpose desired.

Referring to FIG. 10, the output signal from the zero crossing detector 78 is in the form of a square wave pulse train whose period is that of the Doppler signal. This may be converted into a pulse train of twice the frequency using a digital frequency doubler. The output signal from the zero crossing detector also may contain some extraneous or noise signals from the environment.

For example, these may arise from the vibration or from waving vegetation on the surface. Very often these potentially interfering signals are predominantly of low frequency, below that of the signals of interest; a signal frequency corresponding to one mile per hour, for example. A digital high pass filler may be used to cut out signals below a selected signal frequency.

Figure 11:
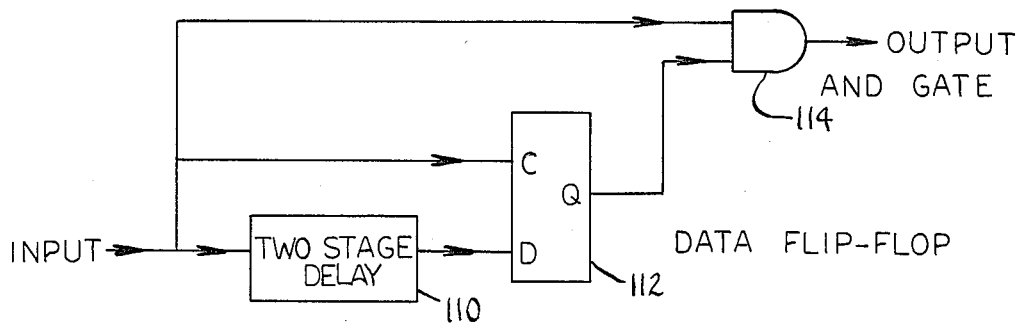
FIG. 11 is an electronic schematic diagram illustrating further circuitry which may be used with FIG. 10.

The circuit of FIG. 11 is a digital high pass filter employing digital circuitry to pass pulse trains which have frequencies above a given cutoff frequency. Pulse trains which have a frequency below a given cutoff frequency are not passed by the circuit. When the high pass filter is used, it is disposed between the zero crossing detector 78 and voltage divider 82 (i.e. between the x's in the line shown in FIG. 10). The operation of the high pass filter circuit will be explained after a discussion of its two-stage delay 110 and data flip-flop 112 components is presented.

The two-stage delay 110 has an output which is triggered by a rising edge of an input signal. If the input is maintained low and then a rising edge occurs at the input the output will remain low for time $T_1$, see FIG. 12. At the end of time $T_1$, the output will be high for time $T_2$ and then return to low. The timing periods $T_1$ and $T_2$ are determined by resistive and capacitive elements in a monostable multivibrator circuit which performs the function of the two-stage delay. If the output is high while a rising edge occurs at the input the output will not become low until after a time of length $T_1+T_2$ measured from the occurrence of the rising edge. Thus, the two-stage delay can be retriggered from the input.

The data flip-flop 112 performs like a memory unit such that the Q output of the flip-flop reflects the state of the D input at the time of the rising edge of the clock pulse at the C input. The Q output of the data flip-flop remains unchanged until the next clock pulse occurs.

Figure 12:
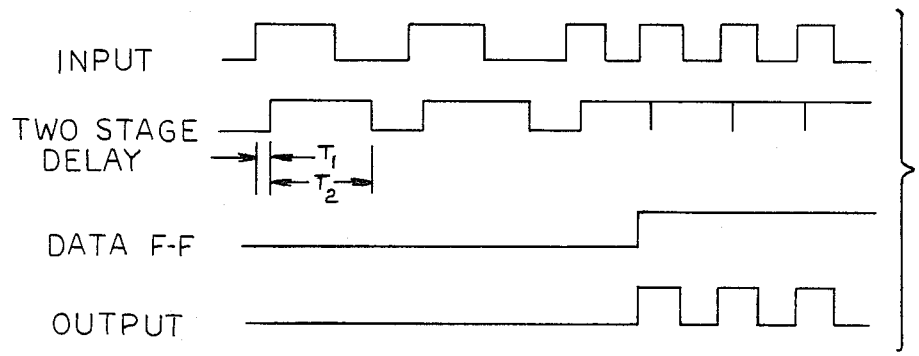
FIG. 12 is a diagram of certain electronic waveforms related to the circuit of FIG. 11.

The operation of the circuit can be understood with the aid of FIG. 11 and the timing diagram of FIG. 12. The cutoff frequency of the digital high pass filter is the frequency which has the period $T_1+T_2$. Any pulse train which has a period greater than $T_1+T_2$ is not passed by the filter and any pulse train which has a period less than $T_1+T_2$ is passed by the filter. Thus a high pass filter is realized because only pulse trains which have frequencies above the cutoff frequency are passed.

The AND Gate 114 passes the input pulse train to the output of the circuit whenever the data flip-flop is in the high state and the AND Gate prevents the input pulse train from passing to the output of the circuit whenever the data flip-flop is in the low state.

The digital high pass filter functions as follows. The state of the data flip-flop is initially low before a pulse train is applied to the input. When a rising edge occurs at the input the two-stage delay is triggered. The clock, C input, of the data flip-flop is connected to the input of the circuit. Therefore the data flip-flop has an output which is low because the output of the two-stage delay was low when the rising edge of the input occurred. When the period of the input pulse train is greater than $T_1+T_2$ the output of the two-stage delay returns to low before the next rising edge of the input pulse train. Therefore the data flip-flop is maintained in the low state and the input pulse train does not pass to the output of the circuit.

When the input pulse train has a period less than $T_1+T_2$ the two-stage delay is retriggered and the output of the two-stage delay does not return to low before the next rising edge of the input pulse train. The data flip-flop has an output which is high when the next rising edge of the input pulse train occurs. Thus the input pulse train passes to the output of the circuit through the AND Gate.

Since the instantaneous frequency of the output signal waveform corresponds to instantaneous vehicle velocity it may be used either directly to provide velocity information, or it may be integrated to provide distance information. This may be done by appropriate circuitry depending upon the particular requirements for the vehicle on which the sensor is used and the particular usage to which the information is put.

Additional circuitry is also employed to verify that a signal is in fact present. For this purpose, full wave rectifier 80 is used to condition the input signal to it so that a measure of its amplitude can be made. The output of the full wave rectifer is a full wave version of the amplified AC portion of the signal plus a DC bias level. An integrator 88 formed from a capacitor and a resistor smooths the rectified output to yield a DC level proportional to the amplitude of the oscillatory input signal.

The DC signal which is developed in the integrator is supplied to an amplitude comparator circuit 90. The output of comparator 90 is connected by a line 92 with the input of stage 84. Two reference voltages are supplied to comparator 90, and the comparator compares the integrated signal with these respective references. These references are provided by respective reference potentiometers and a setting of each potentiometer is correlated to a particular microvolt level of the detector diode signal. One 94 is set to a lower threshold level and the other 96 is set to another higher threshold level; for example, the lower level may be set to about 10 microvolts RMS and the upper level to about 100 microvolts RMS.

The amplitude comparator operates in the following manner. If it is assumed that no signal is being generated by the detector diode, the output of comparator 90 prevents the output of stage 84 from changing. As the vehicle begins to move the detector diode level signal begins to rise. This means that the input to the amplitude comparator circuit correspondingly begins to rise. No change occurs at the output of the comparator so long as the level of the signal into the comparator remains below the level corresponding to the 100 microvolt level, and hence the output of stage 84 remains unchanged. When the 100 microvolt level is exceeded however, comparator 90 allows the output from the zero crossing detector 78 and the voltage divider 82 to pass to the output stage 84, and the information signal to be transmitted to the external utilization device, or devices. Hence, the sensor signal is not made available for external use until the detector diode signal exceeds the upper threshold level. After the detector diode signal level exceeds the upper threshold the amplitude comparator continues to allow the signal to be transmitted through from the zero crossing detector to the output stage so long as the RMS signal level remains above the lower (10 microvolt) level. When the diode signal level drops below the lower threshold, comparator 90 reverts to its first state causing the output stage to become disabled by preventing transmission of the signal from the zero crossing detector through to the input of the output stage. From this description, the reader will preceive that the hysteresis which is provided by amplitude comparator 90 allows the sensor electronics to operate when the signal level is changing rapidly and also to provide a verification that a signal is present. The output stage 84 uses a transistor Q2 to pull the output line to a low voltage when drive is applied to the transistor. The output line voltage is raised by a resistor connected to the collector of the transistor. A further transistor Q1 is employed so that the amount of current which is conducted by transistor Q2 is safely limited to the rating of the latter.

Figure 5:
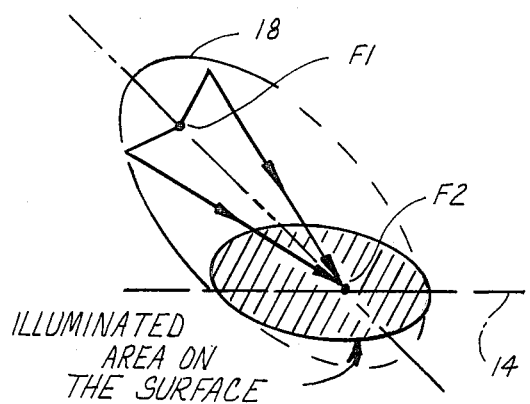
FIG. 5 is a view illustrating schematically the illumination pattern of the sensor.

FIG. 5 diagrammatically illustrates the illumination pattern which is provided on the ground surface by the ellipsoidal reflector. The reflector 18 constitutes a segment of an ellipse the remainder of which is shown in the broken lines. The geometry of an ellipse is such that it has two foci. The present invention involves the construction and arrangement such that one focus F1 is substantially at the antenna feed and the other focus F2 is substantially at the ground surface although it will be appreciated that this may be subject to a certain amount of tolerance. In other words exact placement of the focus F2 on the ground is not critical. Some of the advantages of the ellipsoidal reflector were explained above including certain control of the beam pattern. Further control can be achieved through the construction and arrangement of the sensor with regard to the aperture area.

The relatively short range (distance to target) and large target size suggests that moderate gain, in the order of 20 db, should be sufficient if the target reflectance is not too low. A gain figure of this magnitude requires a relatively small frontal area for the face of the sensor—a desirable feature in keeping the size small.

The gain of a reflector antenna depends on aperture area. Aperture size is often expressed in terms of aperture diameter in wavelengths (free-space wavelength), or $D/\lambda$. The beam width in degrees with a parabolic reflector may typically be in the range of 70 $\lambda/d$, depending on the illumination taper. For the preferred embodiment of the invention an aperture diameter of slightly less than 6 wavelengths at a frequency of 24.125 GHz is chosen.

The gain is affected by distribution of the primary illumination of the reflector by the feed. Uniform illumination should lead to maximum gain, but theoretically gives side lobes only 13 db down from amplitude of the main lobe. It is usually desirable to have side lobes lower than that—perhaps more than 20 db down. Design of the feed can be made to produce almost any taper from center to edge.

In operation the outgoing energy from the rectangular waveguide transmission line of the transmitter/detector assembly, is propagated through the loaded circular waveguide portion of transmission line. From there it is transferred into a short section of dielectric guide transmission line formed by the aforementioned approximately 2 mm long section of bare dielectric. At the splash plate nearly all of the energy is reflected, but very little directly back into the transmission line if dimensions are properly chosen. The energy is not only reflected, but is reflected in a spatial distribution suitable for illumination of the reflector to give tapered illumination from center to outer edge of the reflector. This leads to lowered side lobes. The process is bilateral in that incoming signals striking the reflector are focused to the feed and are transmitted in the transmission line toward the detector/transmitter.

The primary pattern, which determines the illumination distribution on the reflector, may be varied (controlled) by both the lateral size and the shaping of the splash plate. Also, the splash plate does not have to be circular. It can be larger (wider) in one polarization than in the other, as desired, to give some independent control of beam width in each direction.

Figure 9:
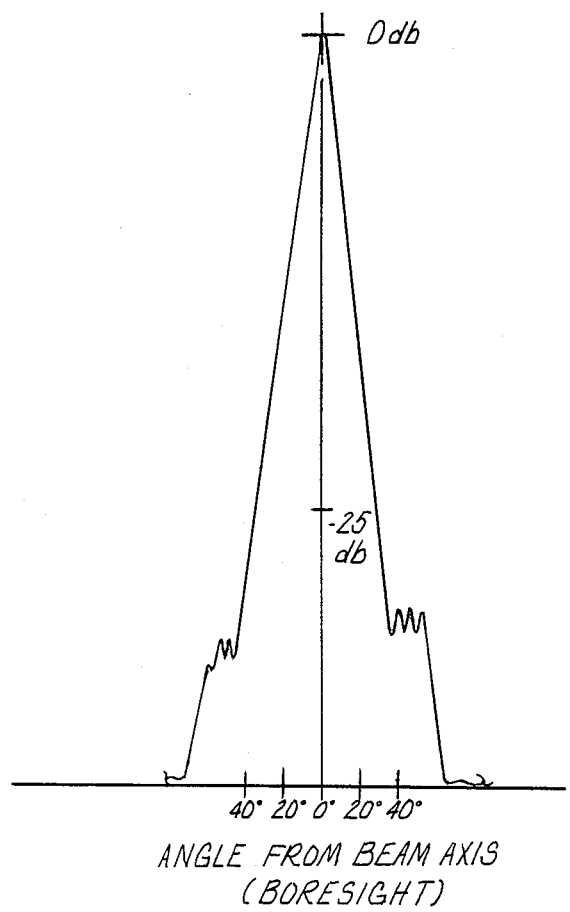
FIGS. 8 and 9 are graph plots illustrating certain characteristics of the sensor.
Figure 8:
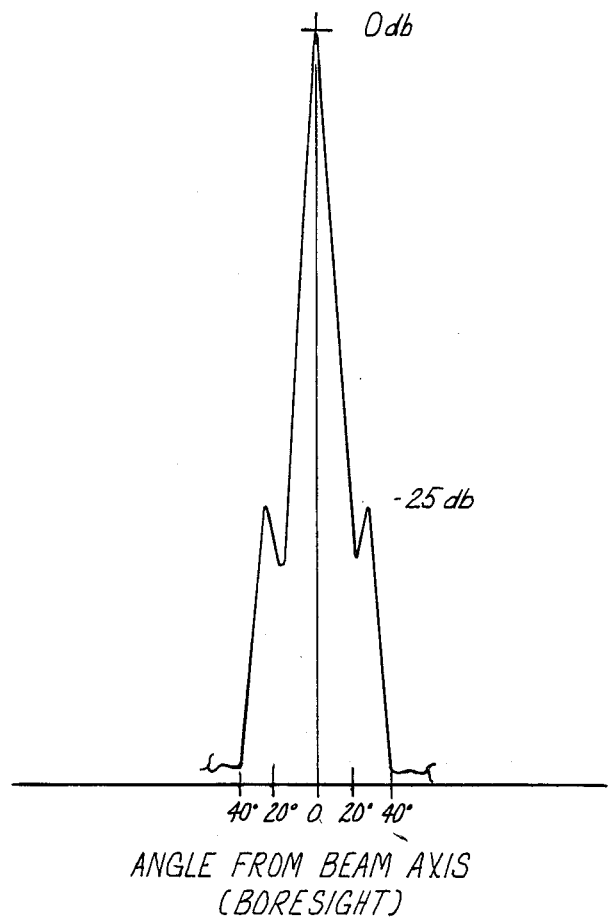

FIGS. 8 and 9 illustrate in a general way the pattern of the illuminated area. FIG. 8 illustrates the E-plane pattern, and FIG. 9 illustrates the H-plane pattern. The graph plots illustrate that the side lobes are substantially attenuated from the main lobe.

The details of the various component parts of the sensor are arrived at utilizing conventional computational techniques and some variations may be indulged in within the scope of the invention. Thus although the illustrated splash plate is a circular disc which is flexed from a flat condition when it is attached to the end of a quartz rod, other constructions are possible as mentioned above. The electronic circuitry is constructed from conventional electronic components and the preferred construction involves the use of standard integrated circuit devices.

While the drawing illustrates a single TGS sensor mounted on the vehicle (either forward or backward looking), the principles of the invention may be applied to other types of installations involving the use of multiple sensors. For example, where the operation of the vehicle is of such a nature that the angle of the beam axis with the ground changes (for example in a situation where a tractor is pulling a heavy load over soft ground and the wheels sink into the ground), error due to change in the angle may be compensated by having two sensors, one forward facing and the other rearward facing and in which a mathematical computation may be performed on the two respective sensor signals, (by means of appropriate electronic circuitry) so as to compensate for the error. This arrangement is referred to as a "Janus system".

Figure 14:
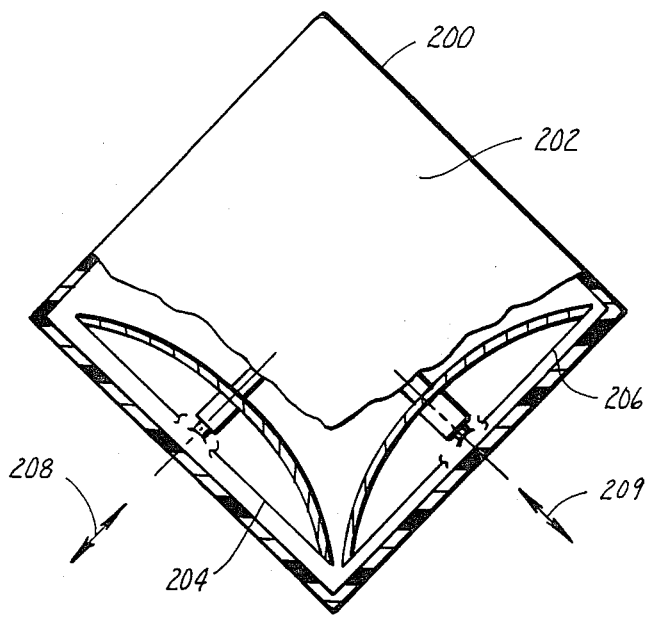
FIG. 14 is a side elevational view, of a semi-schematic nature illustrating a further TGS sensor embodying principles of the present invention.
Figure 15:
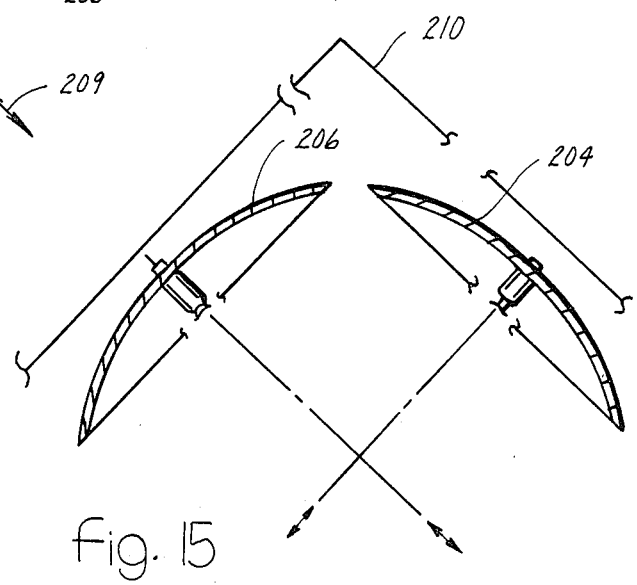
FIG. 15 is a view similar to FIG. 14 illustrating a modified form.

FIGS. 14 and 15 illustrate examples of "Janus" systems.

FIG. 14 illustrates a TGS sensor 200 comprising an enclosure 202. As viewed from the side with a portion of enclosure 202 broken away, one can see that the sensor comprises a forward facing sensor 204 and a rearward facing sensor 206. The sensor 204 transmits and receives in the direction indicated by the double-headed arrow 208 while the sensor 206 transmits and receives in the direction indicated by the double-headed arrow 209. Each sensor 204, 206 comprises further constructional details as described above for the TGS sensor of FIG. 1.

FIG. 15 illustrates a modified form of TGS sensor 210 having a "Janus" configuration. TGS sensor 210 has the rearward facing sensor 206 disposed forwardly within the enclosure relative to the forward facing sensor 204. With this modification, the respective beam axes intersect each other.

Denoting the angle of pitch of the vehicle as p, in degrees, the Doppler signal output of the first and second detectors is as follows:

$$f_{D1} = 2v/\lambda \cos(\theta - p) \quad (2)$$

$$f_{D2} = 2v/\lambda \cos(\theta + p). \quad (3)$$

Adding and combining terms:

$$f_{D1} + f_{D2} = 2v/\lambda \, (2 \cos \theta \cos p). \quad (4)$$

referring to previous equation (1) it is seen that this is equivalent to:

$$f_{D1} + f_{D2} = 2f_D \cos p. \quad (5)$$

Two things may be of interest in this result, Eq. 5. First note that the resulting Doppler frequency is only a slowly varying function of pitch angle, p. Specifically, the error is only 0.03% for p=5° and 1.0% for p=8°. This has been noted in previous publications. Second note that to within an error in amount equal to (1 − cos p), the Doppler signal output is now twice that of the single sensor.

In order to transmit optical signals there may be no need to use the reflector. Instead, since the optical wavelength is much shorter than the microwave, a much smaller aperture will suffice. The end of the quartz dielectric rod will suffice well for many applications. To accomplish the aperture, one may replace the solid disc used as a splash plate with metal mesh. FIG. 13 schematically shows a metal mesh splash plate. Because of the large difference in wavelength, material that is 50 mesh/inch of 0.005 inch wire, for example, will reflect microwave but allow passage of a large portion of the optical signals. One must also use a window that is transparent to light. Note that polypropylene has transparency sufficent to pass an appreciable percentage of incident light.

Although the usage disclosed in FIG. 1 for the sensor is in a TGS system, the sensor can be used in other applications; examples are for intrusion detection and for distance measurement from the sensor to an object whose distance from the sensor is being measured.

While a presently preferred embodiment of the invention has been disclosed, it will be appreciated that principles of the invention are applicable to other embodiments.

What is claimed is:

1. In a ground vehicle having a Doppler radar sensor comprising an antenna reflector which reflects electromagnetic radiation emitted by an antenna feed of the sensor toward the ground at a slant angle and which reflects radiation reflected from the ground back to the antenna feed, the improvement which comprises said reflector having a contour corresponding to a portion of an ellipse one focus of which is centered substantially at the point at which radiation is emitted by the antenna feed and the other focus of which is substantially at the surface of the ground.

2. In a Doppler radar sensor for use such as a true ground speed sensor in a ground vehicle, said sensor having transmitter/detector means, antenna feed means coupled with said transmitter/detector means, and reflector means disposed to reflect electromagnetic radiation between the antenna feed and a target area illuminated by the radiation, the improvement comprising said reflector means having a contour corresponding to that of a portion of an ellipse and the antenna feed being centered substantially at one focus of the ellipse.

3. The improvement set forth in claim 2 in which the electromagnetic radiation which is emitted and received by the sensor passes through a radome which is disposed over and in close proximity to said reflector means and in which the radome comprises a flat element transparent to the radiation.

4. The improvement set forth in claim 3 in which the flat radome element is a plastic having a thickness corresponding to one half wavelength of the radiation.

5. The improvement set forth in claim 2 in which the antenna feed means comprises a circular waveguide, one end of which is disposed substantially at said one focus.

6. The improvement set forth in claim 5 in which said circular waveguide comprises an outer element having a bore of uniform circular cross section and an inner element disposed within said bore and of a material different from that of the outer element and having a circular cross section which provides for a close fit within the bore of the outer element.

7. The improvement set forth in claim 6 in which said outer element is a metal element including a thread providing for mounting of the antenna feed means on the sensor and in which the inner element is a fused quartz dielectric element.

8. The improvement set forth in claim 6 in which the one end of the antenna feed means which is disposed substantially at said one focus comprises the corresponding end of the inner element extending beyond the corresponding end of the outer element, and splash plate means attached to the end of said inner element at said one focus.

9. The improvement set forth in claim 2 further including a radome disposed over the reflector means in close proximity thereto, said antenna feed means passing axially through a central aperture in the reflector means, the transmitter/detector means being disposed axially on the opposite side of the reflector means relative to the radome, the antenna feed means also passing axially into operative association with the transmitter/detector means, and including signal processing electronics disposed axially beyond the transmitter/detector means relative to the reflector means, said radome, said reflector means, said antenna feed means, said transmitter/detector means, and said electronics all being contained within an enclosed housing which has an aperture for the radome which allows electromagnetic radiation to pass to and from the sensor and a connector plug via which information signals developed by the sensor may be supplied to external utilization means.

10. In a Doppler radar sensor having transmitter/detector means, antenna feed means and reflector means, the improvement in which said antenna feed means comprises a circular waveguide assembly having a termination substantially at a focus of the reflector means, said circular waveguide assembly having both microwave and optical transmission properties.

11. The improvement set forth in claim 10 in which said circular waveguide assembly comprises an outer tubular element having a circular axial bore and an inner element having a circular cross section which fits closely within the bore of the outer element.

12. The improvement set forth in claim 11 in which the termination of the circular waveguide assembly which is disposed substantially at a focus of the reflector means comprises the corresponding end of said inner element extending beyond the corresponding end of the outer element and including splash plate means affixed to that end of said inner element.

13. The improvement set forth in claim 12 in which said splash plate means comprises an element in the form of a disc.

14. The improvement set forth in claim 12 in which the opposite end of the inner element projects beyond the corresponding end of the outer element and in which said inner element can transmit both optical and microwave frequencies and in which said splash plate means is in the form of a perforated element so as to reflect microwave frequencies toward the reflector means and to allow optical signals to pass through.

15. The improvement set forth in claim 14 in which the inner element is a dielectric and the dielectric of the dielectrically loaded circular waveguide has an angular cut end to serve both to facilitate impedance matching and to divert optical signals by reflection essentially at a right angle to the axis of the waveguide.

16. The improvement set forth in claim 15 in which an optical detector is disposed radially opposite the angular cut end in the dielectric of the dielectrically loaded waveguide transmission line.

17. The improvement set forth in claim 16 in which the optical detector is disposed 180° from that side with the angular cut end in the dielectric.

18. The improvement set forth in claim 11 in which the inner element is dielectric and the outer element is a conductor, and an angular cut in the dielectric is disposed inside the outer waveguide element with an aperture in the conductive waveguide wall of the outer element and an optical detector is disposed radially to receive optical signals through the aperture, and with a second dielectric element having an identical angular cut confronting and disposed closely against the first dielectric element so as to form a continuing essentially uninterrupted path for the microwave signal.

19. The improvement set forth in claim 18 with the optical detector disposed inside a conductive sleeve fixed at a right angle to the waveguide over the aperture so as to provide a waveguide-below-cut-off choke to impede escape of microwave signals, but allowing passage of optical signals to the optical detector and at same time serving to support the optical detector.

20. The improvement set forth in claim 11 in which said opposite end of said inner element is cut at an angle to reflect optical wavelength energy along a direction transverse to the length of the circular waveguide assembly.

21. The improvement set forth in claim 20 including a photodetector disposed to one side of the circular waveguide assembly to detect reflected optical energy.

22. The improvement set forth in claim 10 in which said circular waveguide assembly comprises an outer tubular element having a circular axial bore and a pair of aligned inner elements disposed within the bore of the outer tubular element, said inner elements having complementary tapered end surfaces confronting each other for reflecting axially traveling optical energy transversely of the circular waveguide assembly, an aperture in the outer element through which the reflected optical energy passes, and a photodetector disposed to detect reflected optical energy passing through said aperture, said inner elements also forming a continuing essentially uninterrupted path for microwave energy.

23. In a Doppler radar sensor for use as a true ground speed sensor in ground vehicle, said sensor having transmitter/detector means for transmitting electromagnetic radiation toward the ground and detecting reflected radiation from the ground and an electronic circuit having an output which provides a signal indicative of motion relative to the ground the improvement in the electronic circuit which comprises means for verifying the presence of a true ground speed signal so that only the true ground speed signal appears at said output, said improvement comprising means defining a first threshold level and means defining a second threshold level which is greater than the first threshold level, comparison means for comparing the amplitude of detected radiation against said references and coupling means operatively coupling said comparison means with the output of the electronic circuit, said comparison means being interactive with said output for permitting a signal to appear at said output whenever the detected radiation has an amplitude greater than the second threshold level and for permitting the signal to continue to appear at the output so long as the detected amplitude remains above the first threshold level after having once exceeded the second threshold level, and for preventing any signal from appearing at the output whenever the detected amplitude is less than the first threshold level.

24. The improvement set forth in claim 23 in which two sensors are disposed in a Janus configuration and whose outputs are the combined sum of the Doppler frequencies of the two sensors.

25. The improvement set forth in claim 23 in which the two thresholds are set by respective potentiometers.

26. The improvement set forth in claim 23 including a digital high pass filter circuit for excluding detected signals below a selected cut-off frequency.

27. The improvement set forth in claim 26 in which said digital high pass filter comprises a two stage delay and a data flip-flop cooperatively arranged such that the first detected pulse signal above the cut-off frequency will be effective at the output provided that it also meets the amplitude criteria set by the threshold levels.

* * * * *